United States Patent
Williams et al.

(10) Patent No.: US 7,968,648 B2
(45) Date of Patent: Jun. 28, 2011

(54) APPROACH FOR ACHIEVING FLAME RETARDANCY WHILE RETAINING PHYSICAL PROPERTIES IN A COMPATIBLE POLYMER MATRIX

(75) Inventors: Martha K. Williams, Titusville, FL (US); Trent M. Smith, Melbourne, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 578 days.

(21) Appl. No.: 11/935,093

(22) Filed: Nov. 5, 2007

(65) Prior Publication Data
US 2008/0061274 A1 Mar. 13, 2008

Related U.S. Application Data

(62) Division of application No. 10/962,827, filed on Oct. 6, 2004, now Pat. No. 7,309,738.

(51) Int. Cl.
*C08F 8/30* (2006.01)
*C08L 77/00* (2006.01)

(52) U.S. Cl. ........ 525/179; 525/178; 525/191; 525/192; 525/181

(58) Field of Classification Search ................... 525/179, 525/178, 191, 192, 181
See application file for complete search history.

(56) References Cited

U.S. PATENT DOCUMENTS

| | | | |
|---|---|---|---|
| 6,423,815 | B1 | 7/2002 | Nakajima et al. |
| 6,750,317 | B2 | 6/2004 | Halik et al. |
| 2003/0139513 | A1 | 7/2003 | Hsu et al. |
| 2004/0138406 | A1 | 7/2004 | Halik et al. |

FOREIGN PATENT DOCUMENTS

JP 01069639 A2 3/1989

OTHER PUBLICATIONS

So, Y. 2000. Rigid Rod Polymers with Enhanced Lateral Interactions. Prog. Polym. Sci. 25:137-157.
Yoo, E-S. 2003. Synthesis and Characterization of the Polyhydroyamide/Polymethoxyamide Family of Polymers. High Performance Polymers 15:519-535.
Tullo, A.H. 2000. Plastics Additives' Steady Evolution. Chemical and Engineering News 78:21-31.
Chang, J-H. 2000. Characterization of Two Precursor Polyblends: Polyhydroxyamide and Poly(amid acid). Polymer Engin. Sci. 40:320-329.
Hsiao, S-H. 2003. Syntheses and Properties of New Aromatic Polybenzoxazoles Bearing Ether and Phenylethylidene or 1-Phenyl-2,2,2-Trifluoroethylidene Linkages. J. Polymer Sci. Part A: Polymer Chem. 41:914-921.
Hsu, S.L-C. 2002. Synthesis and Properties of Polybenzoxazole-Clay Nanocomposites. Polymer 43:4097-4101.

(Continued)

*Primary Examiner* — Duc Truong
(74) *Attorney, Agent, or Firm* — Randall M. Heald; Hugh McTavish

(57) ABSTRACT

The invention provides polymer blends containing polyhydroxyamide and one or more flammable polymers. The polymer blends are flame retardant and have improved durability and heat stability compared to the flammable polymer portion of the blends. Articles containing the polymer blends are also provided.

1 Claim, 3 Drawing Sheets

OTHER PUBLICATIONS

Park, K.H. 1998. Synthesis and Properties of New Soluble Aromatic Polybenzoxazoles from 4,4'-Diamino-3,3'-Dihydroxytriphenylamines and Aromatic Dicarboxylic Acids. J. Polymer Sci. Part A: Polymer Chem. 36:1987-1994.

Tan, L-S. 1997. New Aromatic Benzazole Polymers. I. Benzobisthiazole and Benzobisoxazole Polymers with Main-Chain Triarylamino Units. J. Polymer Sci. Part A: Polymer Chem. 35:1909-1924.

Hsiao, S-H. 1998. Aromatic Polybenzoxazoles Bearing Ether and Isopropylidene or Hexafluoroisopropylidine Units in the Main Chain. Macromol. Chem. Phys. 199:1247-1253.

Imai, Y. 2000. Synthesis of Aromatic Polybenzoxazoles by Silylation Method and their Thermal and Mechanical Properties. Macromol. Chem. Phys. 201:2251-2256.

O'Donnell, P.M. 2003. Synthesis of Low Heat Release, High Char Thermoplastic Polymers. Polymeric Materials: Sci. Eng. 89:802-803.

Yoo, E-S. 2004. Molecular Composites of Fire Safe Polymers and Ionomer. Polymeric Materials: Sci. Eng. 90:462-463.

Yoo, E-S. 2001. Melt and Solution Processing of the Poly(hydroxyamide) Family of Polymers. CUMIRP Cluster F. Oct. 18, 2001.

Gavrin, A.J. 2001. Synthesis and Characterization of Polyhydroxyamide/Polymethoyamides. CUMIRP Cluster F. Oct. 18, 2001.

Zhang, H. Thermal and Flammability Analyses of Poly(hydroxyamide) (PHA) and its Derivatives. CUMIRP Cluster F., 2001.

APPROACH FOR ACHIEVING FLAME RETARDANCY WHILE RETAINING PHYSICAL PROPERTIES IN A COMPATIBLE POLYMER MATRIX

This application is a DIV of Ser. No. 10/962,827 filed Oct. 6, 2004 now U.S. Pat. No. 7,309,738.

ORIGIN OF INVENTION

The invention described herein was made by employees of the United States Government and may be manufactured and used by or for the Government of the United States of America for governmental purposes without the payment of any royalties thereon or therefore.

BACKGROUND

Flame retardant plastics and additives are a 2.2 billion dollar market. Flame retardant plastics and additives are used in electronic devices, mattresses and cushions, and fabrics, including fabrics used in pajamas, blankets, and tents (*Chemical and Engineering News*, Dec. 4, 2000, Vol. 78, No. 49, pp. 21-31).

Heat stabilizers, primarily used in polyvinylchloride pipes, are a 1.8 billion dollar market. Lead and mixed metals such as cadmium/zinc are the most common heat stabilizers. But these have the disadvantage that lead and some other metals are known to carry health risks (Id.).

The most commonly used flame retardants are bromine-, chlorine-, or antimony-containing compounds. An example is brominated polystyrene. Brominated polystyrene is added to polystyrene at an appropriate level to create flame retardant properties. The addition of brominated polystyrene, however, degrades the physical properties of the polystyrene. Halogenated polymers also pose environmental problems. They are believed to release polybrominated dioxins and polybrominated dibenzofurans when incinerated (Id.). Other typical flame retardant additives include halogenated biphenyls, antimony oxide, ammonium polyphosphate, inorganic hydroxides, and organophosphates.

Polybenzoxazoles (PBOs) are one type of flame retardant polymer. Polybenzoxazoles are quite rigid and form a char in heat. The char can seal and protect other flammable materials from fire or heat. (So, Y. H. 2000. *Prog. Polym. Sci.* 25:137.)

Polyhydroxyamides (PHAs) are polymers that cyclize in heat to form PBOs. (Yoo, E.-S. et al. 2003. *High Performance Polymers* 15:519.)

New flame-retardant and heat-stable polymer compositions are needed. Preferably the polymer compositions can retain the range of properties available in polymers that are flammable and heat labile.

SUMMARY

The invention is based on the discovery that incorporating even relatively small amounts of polyhydroxyamide (PHA) and related polymers into polymer blends with larger amounts of other polymers that are flammable or unstable in heat (e.g., nylon) produces blends that are surprisingly flame resistant and resistant to thermal degradation, but that otherwise substantially retain the physical characteristics of the flammable or unstable polymers in the blend. Blends containing more PHA than flammable polymer are even more flame-resistant and durable against thermal degradation than the blends containing low amounts of PHA, and are also useful.

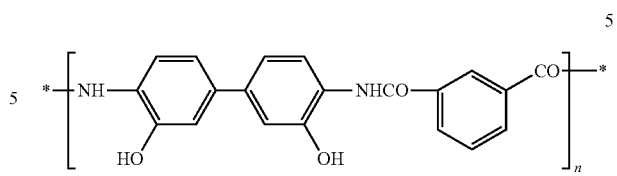

The structure of one type of PHA is shown below as formula 5 Upon heating, the hydroxyl and carbonyl groups of polymer 5 cyclize with loss of water to form a polybenzoxazole (PBO), shown in formula 9.

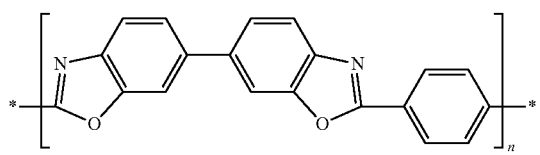

The reaction absorbs energy and helps to resist or extinguish flames. The PBO that is formed also is flame retardant and can form a char upon exposure to flame that seals other materials from the flame.

A PHA of the form of compound 10 is also flame retardant and forms a forms a flame retardant polybisbenzoxazole 11 upon heating.

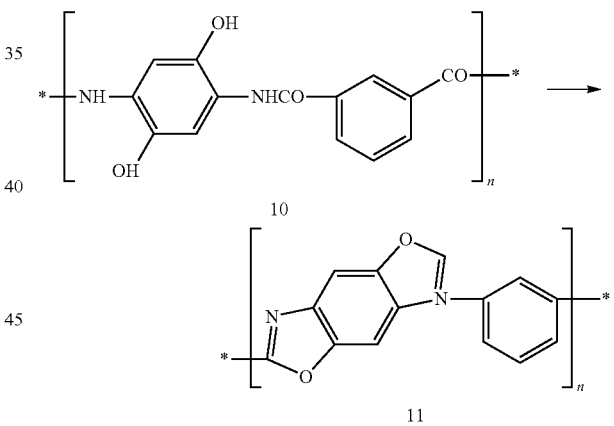

Thus, one embodiment of the invention provides a polymer blend comprising:
(a) one or more flammable polymers; and
(b) a flame-resistant polymer having repeating units of formula 1 or 2

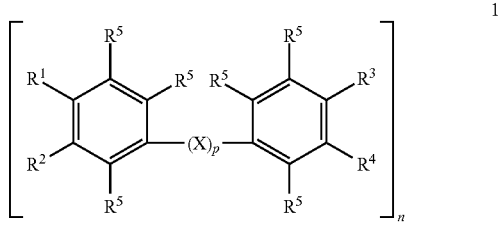

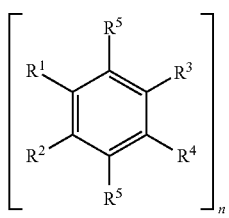

wherein
one of $R^1$ and $R^2$ together with one of $R^3$ and $R^4$ form a polymer backbone group of

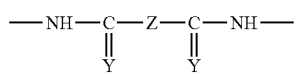

where each Y is independently O or S; and Z is a bivalent radical of from 1 to 100 atoms;

the other of $R^1$ and $R^2$ and the other of $R^3$ and $R^4$ are each —$OR^6$, where each $R^6$ is independently H, $(C_1-C_6)$alkyl, $(C_1-C_6)$alkylcarbonyl, phenyl, —S(O)(O)($OR^7$), —P(O)($OR^7$)($OR^7$), —P(O)(N($R^7$)$_2$)($OR^7$), —P(O)(N($R^7$)$_2$)(N($R^7$)$_2$), —P(O)($R^7$)$_2$, —P(O)($OR^7$)($R^7$), —P(O)(N($R^7$)$_2$)($R^7$), or —Si($R^7$)$_3$;

each $R^5$ is independently H, halo, $(C_1-C_4)$alkyl, phenyl, phenyl$(C_1-C_4)$alkyl, hydroxy, $(C_1-C_4)$alkoxy, $(C_1-C_4)$alkylcarbonyl, $(C_1-C_4)$alkylcarbonyloxy, phenyloxy, —OS(O)(O)($OR^7$), or —OP(O)($OR^7$)($OR^7$);

each $R^7$ is independently H, $(C_1-C_6)$alkyl, or phenyl;

X is a bivalent radical of from 1-100 atoms, and p is 0 or 1;

any alkyl or phenyl can optionally be substituted with one or more halo, hydroxy, nitro, mercapto, cyano, $(C_1-C_6)$alkoxy, trifluoromethyl, oxo, —N($R^8$)$_2$, or —OC(O)$R^8$, wherein each $R^8$ is independently H or $(C_1-C_6)$alkyl;

the repeating units of formula 1 or 2 of (b) comprise 0.1 to 65% by weight of the polymer blend;

the polymer blend is flame resistant;

the polymer blend has a calculated lifetime at 132° C. at least 20% longer than the calculated lifetime of the one or more polymers (a); and wherein when the polymer (a) is nylon, the polymer (b) is not a polymer of formula 3 or 4

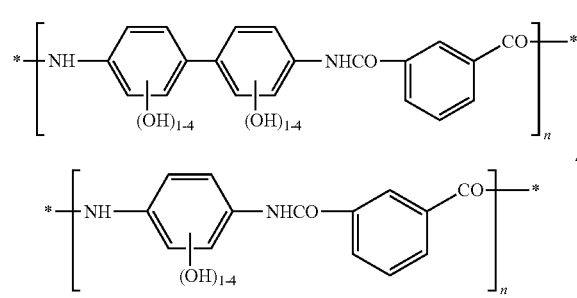

In a preferred embodiment, the repeating units of formula 1 or 2 of (b) comprise 0.1% to 29% by weight of the polymer blend.

Another embodiment of the invention provides an article of manufacture that includes a polymer blend having: (a) one or more flammable polymers; and (b) a heat-stable polymer having repeating units of formula 1 or 2; wherein the repeating units of formula 1 or 2 of (b) comprise 0.1% to 65% by weight of the polymer blend; and wherein the polymer blend has a calculated lifetime at 132° C. at least 20% longer than the calculated lifetime of the one or more polymers (a). In a preferred embodiment, the repeating units of formula 1 or 2 of (b) comprise 0.1% to 29% by weight of the polymer blend.

Another embodiment of the invention provides an article of manufacture that includes a polymer blend having: (a) one or more flammable polymers; and (b) a flame-resistant polymer having repeating units of formula 1 or 2; wherein the repeating units of formula 1 or 2 of (b) comprise 0.1% to 65% by weight of the polymer blend; and wherein the polymer blend is flame resistant. In a preferred embodiment, the repeating units of formula 1 or 2 of the flame-resistant polymer (b) comprise 0.1% to 29% by weight of the polymer blend.

Another embodiment of the invention provides a method of use of a polymer blend involving: incorporating the polymer blend into an article of manufacture to make the article flame resistant; wherein the polymer blend comprises: (a) one or more flammable polymers; and (b) a flame-resistant polymer having repeating units of formula 1 or 2; wherein the repeating units of formula 1 or 2 of (b) comprise 0.1% to 65% by weight of the polymer blend. In a preferred embodiment, the repeating units of formula 1 or 2 of the flame-resistant polymer (b) comprise 0.1% to 29% by weight of the polymer blend.

Another embodiment of the invention provides a method of use of a heat-stable polymer involving: (a) blending the heat-stable polymer with one or more other polymers to create a polymer blend that is more durable than the one or more other polymers; and (b) incorporating the polymer blend into an article of manufacture to make a durable article of manufacture; wherein the heat-stable polymer has repeating units of formula 1 or 2; and wherein the repeating units of formula 1 or 2 of the heat-stable polymer comprise 0.1% to 65% by weight of the polymer blend. In a preferred embodiment, the repeating units of formula 1 or 2 of the heat-stable polymer comprise 0.1% to 29% by weight of the polymer blend.

DETAILED DESCRIPTION

Definitions

Figure 1A:
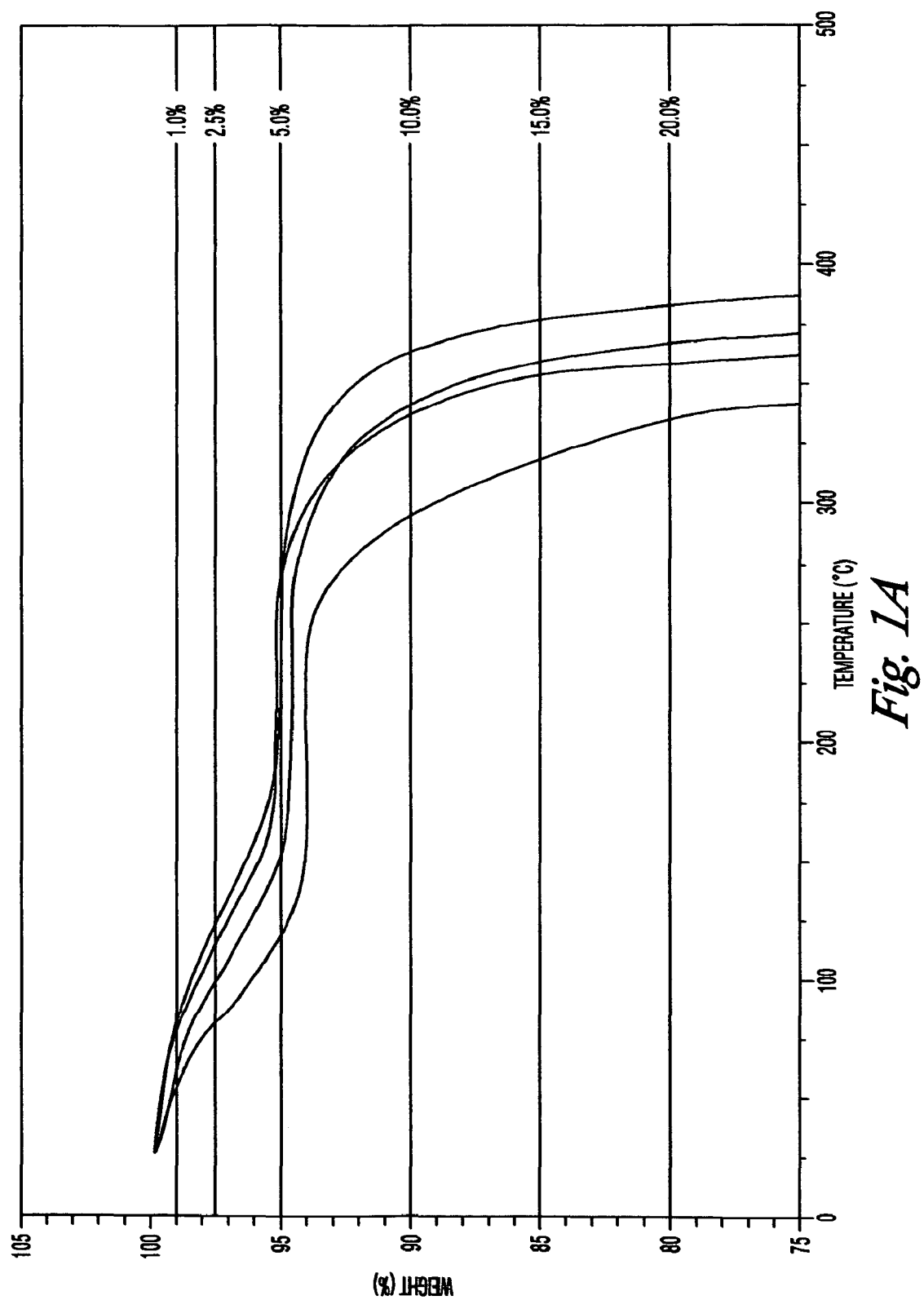
FIGS. 1A-C show thermograms of, (FIG. 1A) virgin extruded nylon MXD6, (FIG. 1B) 5% PHA/95% MXD6, and (FIG. 1C) 8% PHA/92% MXD6. Each figure shows thermograms at four different heating rates.

References herein to a material self-extinguishing in air or a 23.2% oxygen atmosphere in a given time period refer to the following test. Ribbons of the material are held in a vertical position and the topmost portion of the material is ignited from above by a flame. Upon removal of the external flame, the time to self-extinguishing of the burning material is measured.

A "flame resistant" material, as used herein, refers to a material that self-extinguishes in air (20.95% oxygen) within 30 seconds upon removal of the flame in the above test.

A "flammable" material, as used herein, refers to a material that is not flame resistant.

The "oxygen index" of a material refers to the lowest percent of oxygen in an oxygen/nitrogen atmosphere in which the material will just maintain candle-like burning when ignited from above. See ASTM D2863, produced by the American Society for Testing and Materials, and available from the American National Standards Institute, www.ansi.org.

The "calculated lifetime" of a material at a given temperature refers to the lifetime calculated from thermogravimetric analysis involving heating in a nitrogen atmosphere, using the method of Flynn and Wall (Flynn, J. H. et al. 1966. *Polymer Lett.* 4:323-328). and Toop (Toop, D. J. 1971. *IEE Trans. Elect. Ins.* Vol. EI-6, pp. 2-14), as described in Example 1 below.

Description

The inventors have discovered that relatively small amounts of a PHA added to a flammable and heat-sensitive polymer creates a polymer blend that is flame resistant and significantly more durable (resistant to thermal degradation) than the flammable and heat-sensitive polymer.

Thus, the invention provides a polymer blend containing:
(a) one or more flammable polymers; and
(b) a flame-resistant polymer having repeating units of formula 1 or 2

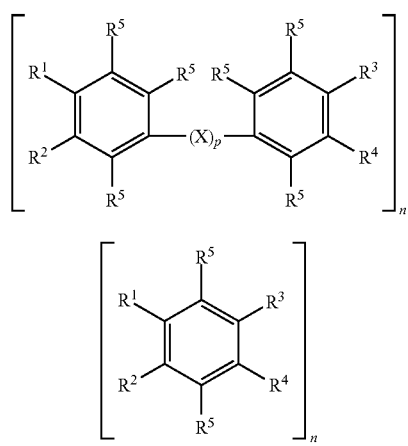

1

2 wherein
one of $R^1$ and $R^2$ together with one of $R^3$ and $R^4$ form a polymer backbone group of

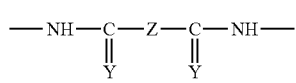

8 where each Y is independently O or S; and Z is a bivalent radical of from 1 to 100 atoms;

the other of $R^1$ and $R^2$ and the other of $R^3$ and $R^4$ are each —$OR^6$, where each $R^6$ is independently H, ($C_1$-$C_6$)alkyl, ($C_1$-$C_6$)alkylcarbonyl, phenyl, —S(O)(O)($OR^7$), —P(O)($OR^7$)($OR^7$), —P(O)(N($R^7$)$_2$)($OR^7$), —P(O)(N($R^7$)$_2$)(N($R^7$)$_2$), —P(O)($R^7$)$_2$, —P(O)($OR^7$)($R^7$), —P(O)(N($R^7$)$_2$)($R^7$), or —Si($R^7$)$_3$;

each $R^5$ is independently H, halo, ($C_1$-$C_4$)alkyl, phenyl, phenyl($C_1$-$C_4$)alkyl, hydroxy, ($C_1$-$C_4$)alkoxy, ($C_1$-$C_4$)alkylcarbonyl, ($C_1$-$C_4$)alkylcarbonyloxy, phenyloxy, —OS(O)(O)($OR^7$), or —OP(O)($OR^7$)($OR^7$);

each $R^7$ is independently H, ($C_1$-$C_6$)alkyl, or phenyl;
X is a bivalent radical of from 1-100 atoms, and p is 0 or 1;

any alkyl or phenyl can optionally be substituted with one or more halo, hydroxy, nitro, mercapto, cyano, ($C_1$-$C_6$) alkoxy, trifluoromethyl, oxo, —N($R^8$)$_2$, or —OC(O)$R^8$, wherein each $R^8$ is independently H or ($C_1$-$C_6$)alkyl; and the repeating units of formula 1 or 2 of (b) comprise 0.1 to 65% by weight of the polymer blend.

Typically the polymer blend is flame resistant, and has a calculated lifetime at 132° C. at least 20% longer than the calculated lifetime of the one or more polymers (a).

When the polymer (a) is nylon, the polymer (b) is not a polymer of formula 3 or 4.

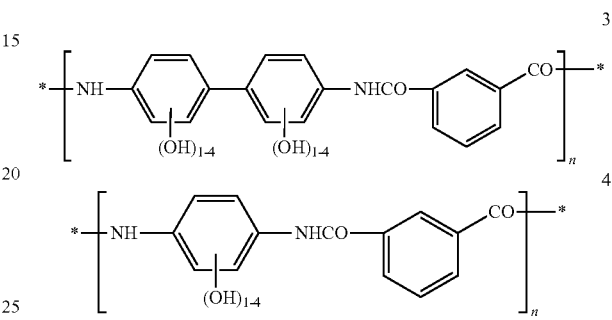

In a preferred embodiment, the repeating units of formula 1 or 2 of (b) comprise 0.1% to 29% by weight of the polymer blend.

In specific embodiments, Z of the polymer backbone is predominantly aromatic. In particular embodiments, more than 50% of the atoms of Z are aromatic C or H ring atoms.

In particular embodiments, Z is para or meta phenyl, biphenyl, biphenyl ether,

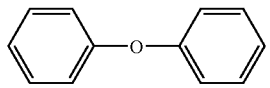

triphenyl amine,

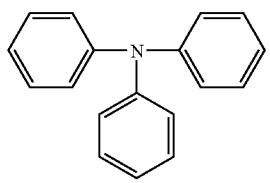

or triphenylphosphoric acid ester (CAS 115-86-6),

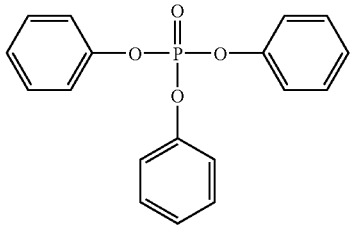

where the phenyl rings of Z are optionally halogenated. Preferably, the polymer backbone C═Y groups are para or meta to the position of the central group or bond linking multiple phenyl groups in Z groups with multiple phenyls.

In particular preferred embodiments, Z is para or meta phenyl.

In preferred embodiments, Y is oxygen.

In preferred embodiments of the polymer blend, the other of $R^1$ and $R^2$ and the other of $R^3$ and $R^4$ (the $R^1$ or $R^2$ group and $R^3$ or $R^4$ group that are do not form the polymer backbone) are each —$OR^6$, where each $R^6$ is independently H, $(C_1-C_6)$alkyl, $(C_1-C_6)$alkylcarbonyl, —S(O)(O)($OR^8$), —P(O)($OR^8$)($OR^8$), or —Si($R^7$)$_3$, where each $R^8$ is independently H or $(C_1-C_6)$alkyl, and each $R^7$ is independently H, $(C_1-C_6)$alkyl, or phenyl.

In certain embodiments, each $R^6$ is independently H, $(C_1-C_4)$alkyl, $(C_1-C_4)$alkylcarbonyl, —P=O(OMe)(OMe), or —Si(Me)$_3$.

In other specific embodiments, each $R^6$ is H.

In particular embodiments, each $R^5$ is independently H, halo, or hydroxy. In specific embodiments, each $R^5$ is H.

In particular embodiments, X is O, S, CO, NH optionally substituted with methyl, trifluoromethyl, or phenyl; or methylene optionally substituted with one or two methyl, trifluoromethyl, phenyl, or halo; where the phenyls are optionally halogenated; and p is 0 or 1.

In particular embodiments, p is zero.

In particular embodiments of the polymer blends, $R^1$ and $R^3$ together form the polymer backbone group. In other particular embodiments, $R^2$ and $R^4$ together form the polymer backbone group.

In particular embodiments of the polymer blends, the polymer (b) is a copolymer. Where the polymer (b) is a copolymer, the polymer (b) can consist only of units of formula 1 or 2 or both, or it can comprise units not of formula 1 or 2.

In particular embodiments of the polymer blends, the polymer (b) is a homopolymer.

In particular embodiments of the blends, the polymer (a) includes a polyamide. More specifically, it may include a nylon. More specifically still, it may include nylon MXD6.

Many flammable polymers can be blended with the PHAs and related polymers in the blends of the invention. The polymer (a) can include, for instance, a polyamide (e.g., nylon 6, nylon 6/6, nylon 12, or nylon MXD6), a polyester (e.g., poly(ethylene terephthalate) (PET), poly(ethylene terephthalate) glycol modified copolymer (PETG), poly(butylene terephthalate) (PBT), polycaprolactone (PCL), poly (hydroxybutyrate) (PHB), or poly(4-hydroxy benzoic acid)), an acrylic polymer (e.g., poly(methylmethacrylate) (PMMA), poly(methyl acrylate) (PMA), poly(ethyl acrylate) (PEA), or polyacrylonitrile), a cellulosic polymer (e.g., cellulose or cellulose acetate), a vinyl polymer (e.g., polystyrene, polystyrene syndiotactic, acrylonitrile-butadiene-styrene terpolymer, poly(vinyl acetate), styrene-acrylonitrile copolymer, or polychloroprene), a liquid crystal polymer (e.g., VECTRA™, VECTRAN™, OR ZENITE™), a conducting polymer (e.g., polypyrrole, polythiophene, or polyaniline), polyurethane, or polyurea.

The polymer (a) of the blends can also be a vinylidine polymer, (e.g., polyisobutylene), polyethylene, or polypropylene.

In particular embodiments, the polymer (b) is a polymer of formula 5.

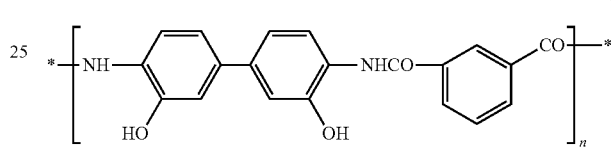

5

In particular embodiments of the polymer blend, the polymer (a) is not polycarbonate, polyacetal, polyester, or an aliphatic polyether.

In particular embodiments, the polymer (a) is not poly (propylene glycol)-bis-(2-aminopropyl ether).

In specific embodiments of the blends, the polymer (b) is not compound 6 or 7.

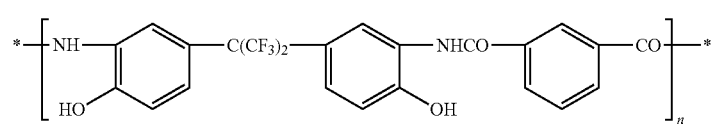

6

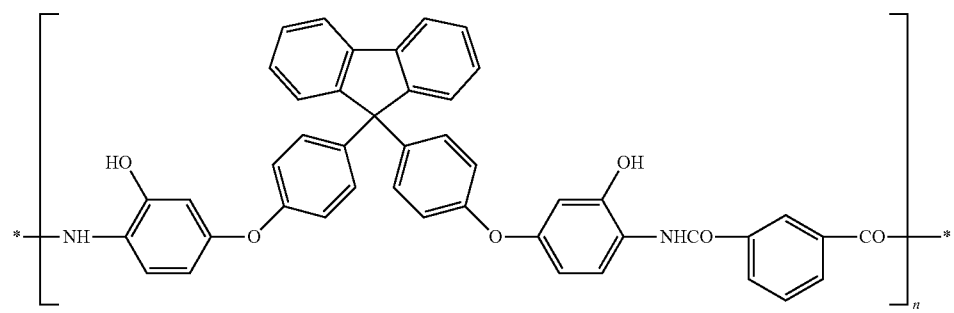

7

In particular embodiments, the polymer blend does not burn or self-extinguishes in 10 seconds or less in air. In specific embodiments, in a 23.2% oxygen atmosphere the polymer blend does not burn or self-extinguishes in 30 seconds or less, more preferably in 20 seconds or less, most preferably in 10 seconds or less.

In particular embodiments, the oxygen index of the polymer blend is more than 21%, more than 22%, more than 23%, or more than 24%.

In particular embodiments, the polymer blend has a calculated lifetime at 132° C. at least 20%, at least 40%, at least 70%, at least 100%, at least 200%, or at least 10 times longer than the calculated lifetime of the one or more polymers (a). That is, the polymer blend calculated lifetime is at least 20%, at least 40%, at least 70%, at least 100%, at least 200%, or at least 10 times longer than the calculated lifetime of the otherwise identical composition lacking polymer (b). In particular embodiments, the polymer blend has a calculated lifetime at 80° C. at least 20%, at least 40%, at least 70%, at least 100%, at least 200%, or at least 10 times longer than the calculated lifetime of the one or more polymers (a).

In particular embodiments of the blend, the repeating units of formula 1 or 2 of polymer (b) comprise 0.1% to 67% or 50% by weight of the blend. In particular embodiments of the blend, the repeating units of formula 1 or 2 of polymer (b) comprise 0.1% to 24%, 19%, 15%, 10%, 8%, 6%, 5%, 4%, 3%, or 2% by weight of the blend. In other embodiments of the blend, the repeating units of formula 1 or 2 of polymer (b) comprise 2% to 29%, 24%, 190%, 15%, 10%, 8%, 6%, 5%, 4%, or 3% by weight of the blend. In other embodiments, the repeating units of formula 1 or 2 of polymer (b) comprise 4% to 29%, 24% 19%, 15%, 10%, 8%, 6%, or 5% by weight of the blend.

In particular embodiments of the blends, the flame-resistant polymer (b) consists of repeating units of formula 1. In other particular embodiments, the flame-resistant polymer (b) consists of repeating units of formula 2.

Many flame-retardant plastics produce halogenated dioxins or halogenated dibenzofurans upon exposure to flame or extreme heat. These are toxic chemicals. One of the advantages of PHAs that lack halogens is they do cannot produce these toxins. Thus, in one embodiment of the invention, the polymer (b) having repeating units of formula 1 or 2 has no halogen atoms.

In particular embodiments of the articles of manufacture, the polymer blend in the article is flame resistant.

In particular embodiments of the articles of manufacture, the articles are flame resistant.

EXAMPLES

Example 1

Preparation of polyhydroxyamide. To 300 ml N-methyl-2-pyrrolidinone (NMP) chilled in an ice-acetone bath was added 5.88 g anhydrous LiCl, 14.55 g 3,3'-dihydroxybenzidine[4,4'-diamino-3,3'-dihydroxybiphenyl], and 13.66 g terephthaloyl chloride. The mixture was stirred for 1 hour chilled and then overnight at room temperature. The solution was then poured slowly into 800 ml methanol, washed in methanol for 1 hour, filtered, and then washed in methanol for another hour and filtered again. The filtrate was freeze dried. The structure of the product PHA is formula 8.

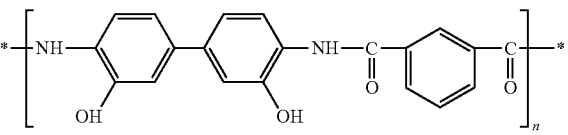

Preparation of unmodified nylon MXD6 and MXD6-PHA blends. To prepare unmodified nylon ribbons, nylon ND6 pellets from Mitsubishi Gas Chemical America, Inc. were extruded at 215-250° C., 35 rpm. To prepare blends, PHA was ground by mortar and pestle, then hand mixed with MXD6 pellets followed by extrusion at 230-255° C., 35 rpm. Blends containing 5% and 7.7% PHA by weight were prepared.

Characterization.

Per the ASTM D-2863 test, the unmodified MXD6 had an oxygen index of less than 23.2%. The MXD6-PHA 8% material was found to have an oxygen index of 24.6%. The oxygen index (also known as limiting oxygen index or LOI) is the measurement of the minimum oxygen concentration that will just support flaming combustion in a flowing mixture of oxygen and nitrogen.

Unmodified MXD6 burned for 117 seconds in a 23.2% oxygen atmosphere and then had to be extinguished with nitrogen. A 92.3% MXD6/7.7% PHA blend (M6-PHA 8%) burned for 8 seconds in a 23.2% oxygen atmosphere before self-extinguishing.

Thermogravimetric analysis (TGA) was used to estimate polymer lifetime. The samples were heated and weighed in a nitrogen atmosphere, and the TA Instruments Thermal Specialty Library Version 1.4 program was used to calculate the activation energies of thermal decomposition. The samples were all run in nitrogen atmosphere. The activation energy of thermal decomposition is calculated using the Flynn and Wall method (Flynn, J. H. et al. 1966. *Polymer Lett.* 4:323-328). Then the lifetime is calculated from the activation energy according to the method of Toop (Toop, D. J. 1971. *IEE Trans. Elect. Ins.* Vol. EI-6, pp. 2-14).

Figure 1B:
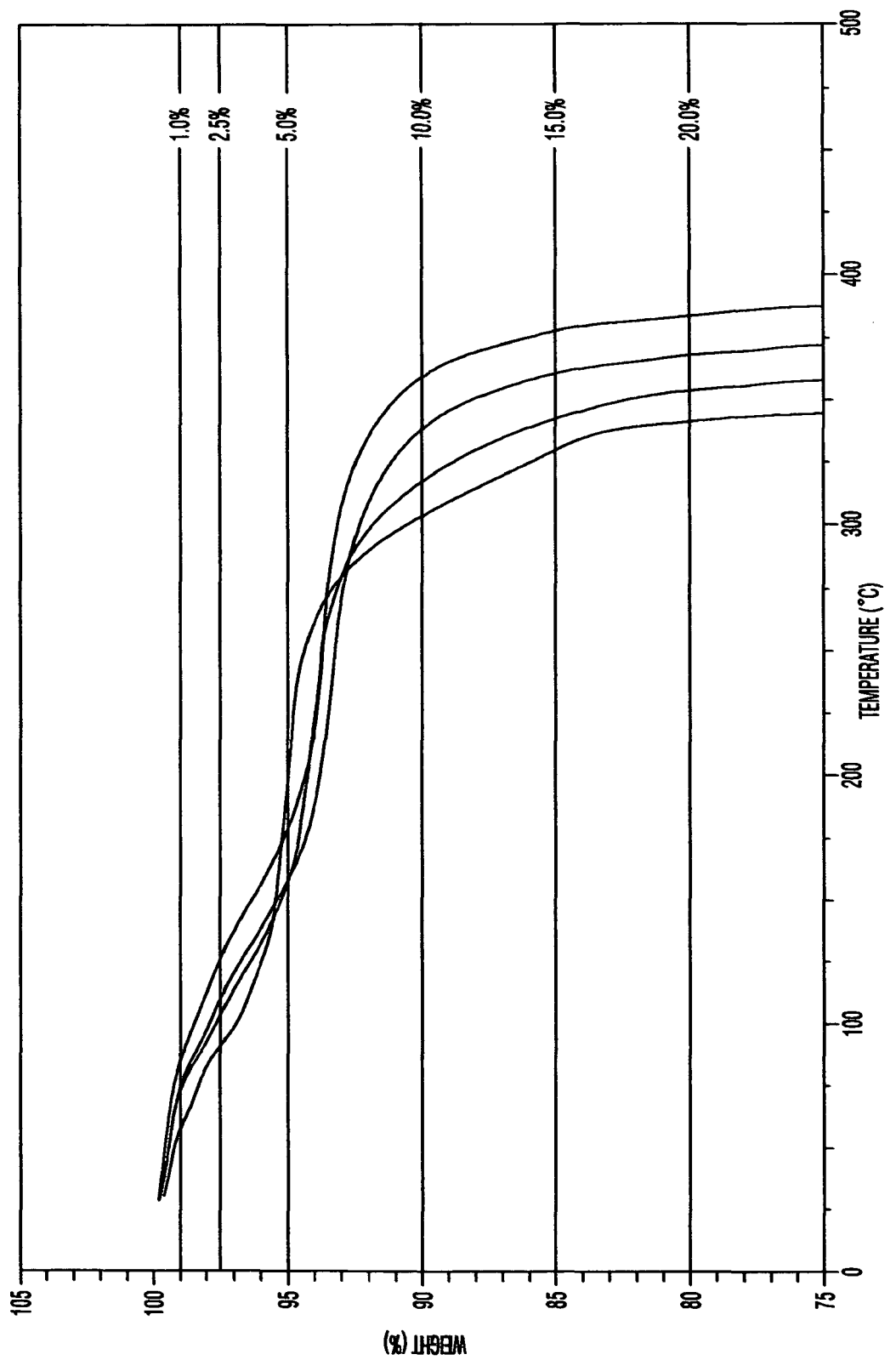
Figure 1C:
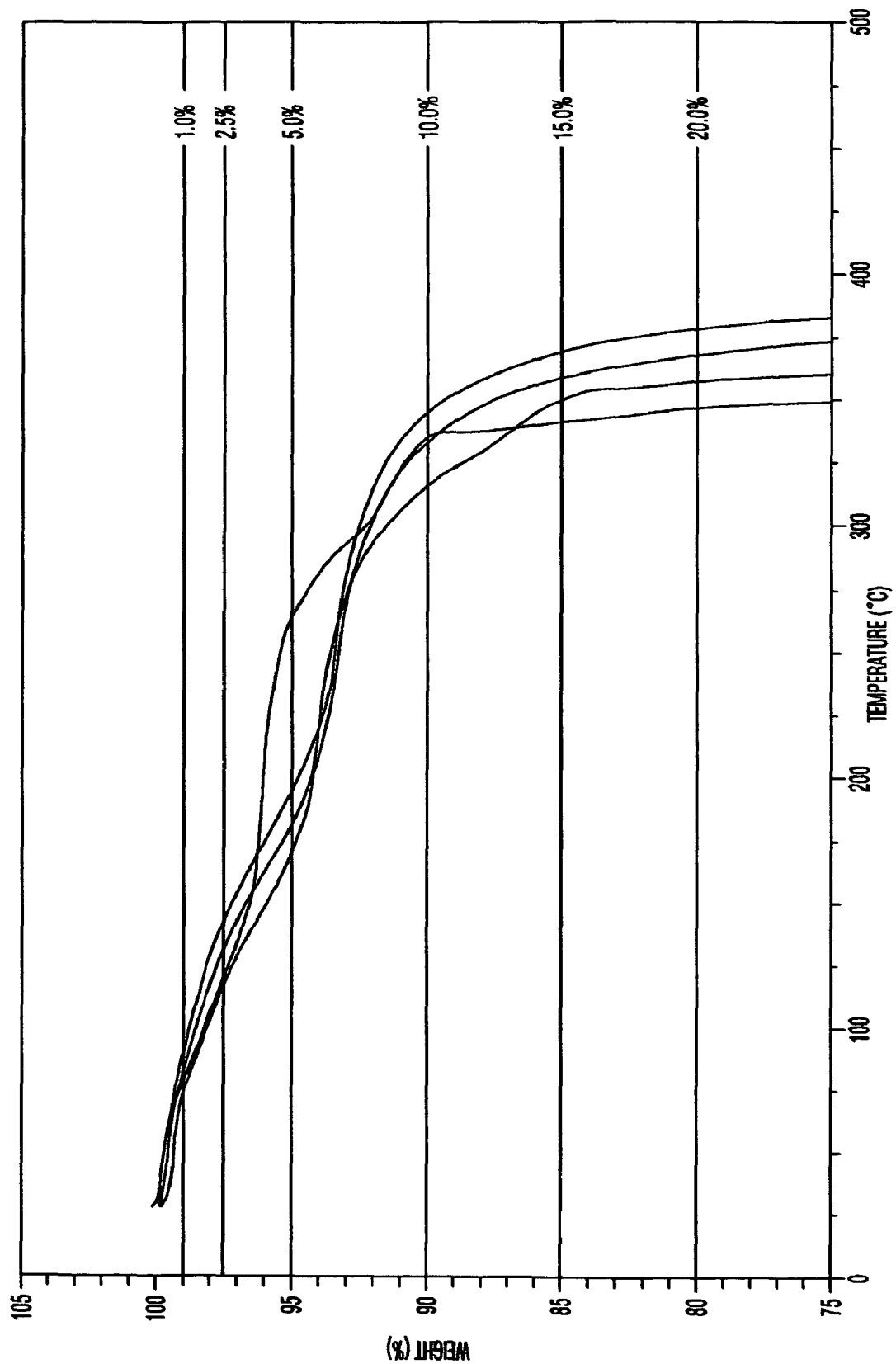

The Flynn and Wall method for determining activation energy of decomposition involves determining the temperatures at which a given percent mass loss is obtained with different heat rates in TGA, and plotting the reciprocal of the absolute temperature versus the heating rate. The thermograms of nylon N=6 (panel A), MXD6 with 5% PHA (B), and MXD6 with 8% PHA (C) are shown in FIG. 1. Each panel shows the thermograms at four heating rates. The temperature of 10% mass loss was used, since this point was in early decomposition in all the thermograms. Mass losses of 5% or less are associated with water loss, so it is not appropriate to make the calculations based on the temperature of mass loss of 5% or less.

The data analysis from TGA of unmodified MXD6, 5% PHA, and 8% PHA are shown in Tables 1-3.

TABLE 1

Virgin MXD6 nylon
Activation energy: 98.2 kJ/mole
Log[pre-exponential factor]: 6.573 log[1/min]
Conversion level: 10%

| Temperature | | | |
|---|---|---|---|
| ° C. | ° K | 1/T (1000/° K) | Lifetime (hours) |
| 28 | 301.1 | 3.321 | 4.22E7 |
| 80 | 353.1 | 2.832 | 131,000 |

TABLE 1-continued

Virgin MXD6 nylon
Activation energy: 98.2 kJ/mole
Log[pre-exponential factor]: 6.573 log[1/min]
Conversion level: 10%

| Temperature | | | |
|---|---|---|---|
| °C. | °K | 1/T (1000/° K) | Lifetime (hours) |
| 132 | 405.1 | 2.468 | 1790 |
| 184 | 457.1 | 2.187 | 64.9 |
| 236 | 509.1 | 1.964 | 4.64 |
| 288 | 561.2 | 1.782 | 0.54 |
| 340 | 613.2 | 1.631 | 0.0906 |
| 392 | 665.2 | 1.503 | 0.0201 |
| 444 | 717.2 | 1.394 | 0.00554 |
| 496 | 769.2 | 1.300 | 0.00182 |

TABLE 2

MXD6 nylon, 5% PHA
Activation energy: 100.8 kJ/mole
Log[pre-exponential factor]: 6.873 log[1/min]
Conversion level: 10%

| Temperature | | | |
|---|---|---|---|
| °C. | °K | 1/T (1000/° K) | Lifetime (hours) |
| 28 | 301.1 | 3.321 | 9.48E7 |
| 80 | 353.1 | 2.832 | 253,000 |
| 132 | 405.1 | 2.468 | 3080 |
| 184 | 457.1 | 2.187 | 102 |
| 236 | 509.1 | 1.964 | 6.83 |
| 288 | 561.2 | 1.782 | 0.752 |
| 340 | 613.2 | 1.631 | 0.120 |
| 392 | 665.2 | 1.503 | 0.0256 |
| 444 | 717.2 | 1.394 | 0.00684 |
| 496 | 769.2 | 1.300 | 0.00218 |

TABLE 3

MXD6 nylon, 8% PHA
Activation energy: 121.4 kJ/mole
Log[pre-exponential factor]: 8.804 log[1/min]
Conversion level: 10%

| Temperature | | | |
|---|---|---|---|
| °C. | °K | 1/T (1000/° K) | Lifetime (hours) |
| 28 | 301.1 | 3.321 | 1.53E10 |
| 80 | 353.1 | 2.832 | 1.21E7 |
| 132 | 405.1 | 2.468 | 60,100 |
| 184 | 457.1 | 2.187 | 996 |
| 236 | 509.1 | 1.964 | 38.1 |
| 288 | 561.2 | 1.782 | 2.67 |
| 340 | 613.2 | 1.631 | 0.294 |
| 392 | 665.2 | 1.503 | 0.0457 |
| 444 | 717.2 | 1.394 | 0.00931 |
| 496 | 769.2 | 1.300 | 0.00235 |

Thus, the addition of relatively small amounts of PHA significantly enhanced the durability of the polymers. MXD6 with 8% PHA had a calculated lifetime at 132° C. 33.5 times longer than pure MXD6. At 28° C., the 8% PHA blend had a calculated lifetime 362 times longer than pure MXD6.

The average tensile strength of MXD6-PHA 8% was 8.64±0.66 ksi, versus average tensile strength of pure MXD6 of 9.78±0.77 ksi, an 11% decrease upon the addition of 8% PHA. The modulus of pure MXD6 was 420 ksi, and of MXD6-PHA 8% was 430 ksi, a 3% increase. Thus, the tensile strength and modulus of the 8% PHA blend were quite similar to pure MXD6.

All cited patents, patent documents, and other references are hereby incorporated by reference.

What is claimed is:

1. A method of use of a heat-stable polymer comprising:
blending the heat-stable polymer with one or more other polymers to create a polymer blend that is more durable than the one or more other polymers; and
incorporating the polymer blend into an article of manufacture to make a durable article of manufacture;
wherein the heat-stable polymer has repeating units of formula 1 or 2;

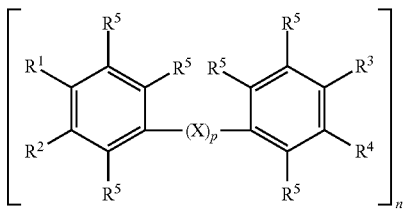

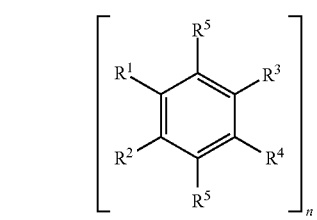

wherein
one of $R^1$ and $R^2$ together with one of $R^3$ and $R^4$ form a polymer backbone group of where each Y is independently O or S; and Z is a bivalent radical of from 1 to 100 atoms;

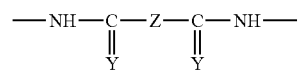

the other of $R^1$ and $R^2$ and the other of $R^3$ and $R^4$ are each —$OR^6$, where each $R^6$ is independently H, $(C_1-C_6)$ alkyl, $(C_1-C_6)$alkylcarbonyl, phenyl, —$S(O)(O)(OR^7)$, —$P(O)(OR^7)(OR^7)$, —$P(O)(N(R^7)_2)(OR^7)$, —$P(O)(N(R^7)_2)(N(R^7)_2)$, —$P(O)(R^7)_2$, —$P(O)(OR^7)(R^7)$, —$P(O)(N(R^7)_2)(R^7)$, or —$Si(R^7)_3$;
each $R^5$ is independently H, halo, $(C_1-C_4)$alkyl, phenyl, phenyl$(C_1-C_4)$alkyl, hydroxy, $(C_1-C_4)$alkoxy, $(C_1-C_4)$alkylcarbonyl, $(C_1-C_4)$alkylcarbonyloxy, phenyloxy, —$OS(O)(O)(OR^7)$, or —$OP(O)(OR^7)(OR^7)$;
each $R^7$ is independently H, $(C_1-C_6)$alkyl, or phenyl;
X is a bivalent radical of from 1-100 atoms, and p is 0 or 1;
any alkyl or phenyl can optionally be substituted with one or more halo, hydroxy, nitro, mercapto, cyano, $(C_1-C_6)$ alkoxy, trifluoromethyl, oxo, —$N(R^8)_2$, or —$OC(O)R^8$, wherein each $R^8$ is independently H or $(C_1-C_6)$alkyl; and
wherein the repeating units of formula 1 or 2 comprise 0.1 to 65% by weight of the polymer blend; and
wherein the one or more other polymers comprise polyisobutylene, polyethylene, or polypropylene.

* * * * *